United States Patent [19]

Bytzek

[11] 4,273,547
[45] Jun. 16, 1981

[54] METHOD OF PULLEY MANUFACTURE AND PRODUCT

[75] Inventor: Klaus K. Bytzek, Toronto, Canada

[73] Assignee: Drive Manufacturing Inc., Weston, Canada

[21] Appl. No.: 76,279

[22] Filed: Sep. 17, 1979

Related U.S. Application Data

[63] Continuation of Ser. No. 850,356, Nov. 10, 1977, abandoned.

[30] Foreign Application Priority Data

Feb. 4, 1977 [CA] Canada .................................. 271068

[51] Int. Cl.³ .......................... F16H 55/44; B21K 1/42
[52] U.S. Cl. ..................................... 474/170; 29/159.3
[58] Field of Search ............. 74/230.8, 230.01, 230.05, 74/230.3; 29/159 R, 159.3; 474/168, 169, 170

[56] References Cited

U.S. PATENT DOCUMENTS

| | | |
|---|---|---|
| 1,828,464 | 10/1931 | Harrison ................................ 72/82 |
| 2,685,856 | 8/1954 | Wickwire et al. ..................... 113/52 |
| 2,892,431 | 6/1959 | Killian et al. ............................ 72/82 |
| 2,929,345 | 3/1960 | Zatyko ................................ 74/230.8 |
| 3,368,376 | 2/1968 | Previte ..................................... 72/82 |
| 3,654,790 | 4/1972 | Zatko ....................................... 72/82 |
| 3,851,366 | 12/1974 | Jacobs ............................ 74/230.8 X |
| 3,852,863 | 12/1974 | Killian et al. ....................... 29/159 R |
| 3,977,264 | 8/1976 | Sproul ................................. 74/230.8 |
| 4,050,321 | 9/1977 | Kraft ................................... 74/230.8 |
| 4,055,977 | 11/1977 | Haswell ................................... 72/84 |
| 4,098,137 | 7/1978 | Yaros .................................. 74/230.8 |

Primary Examiner—C. J. Husar
Assistant Examiner—Conrad Berman
Attorney, Agent, or Firm—Cushman, Darby & Cushman

[57] ABSTRACT

This invention relates to a novel method of making pulleys and pulley blanks from sheet metal. The sheet metal is stamped into pulley blanks having an upstanding cylindrical wall, the cylindrical wall is then thickened by being partially collapsed axially, followed by contacting with a roller. The roller can have a plurality of v-shaped grooves on its surface, to form a pulley for use with a poly-v belt.

13 Claims, 15 Drawing Figures

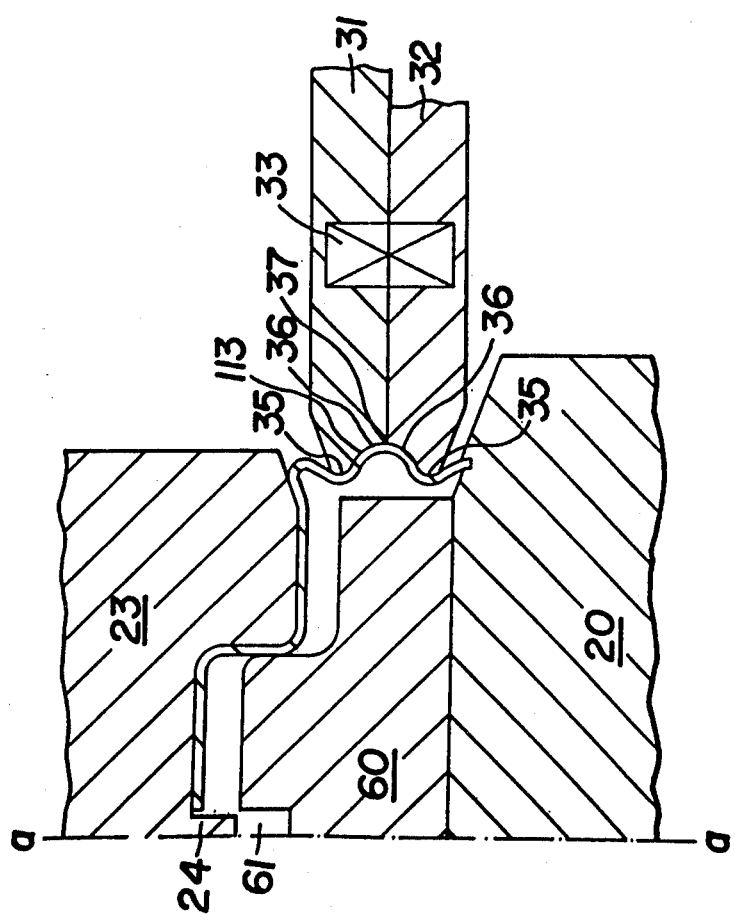
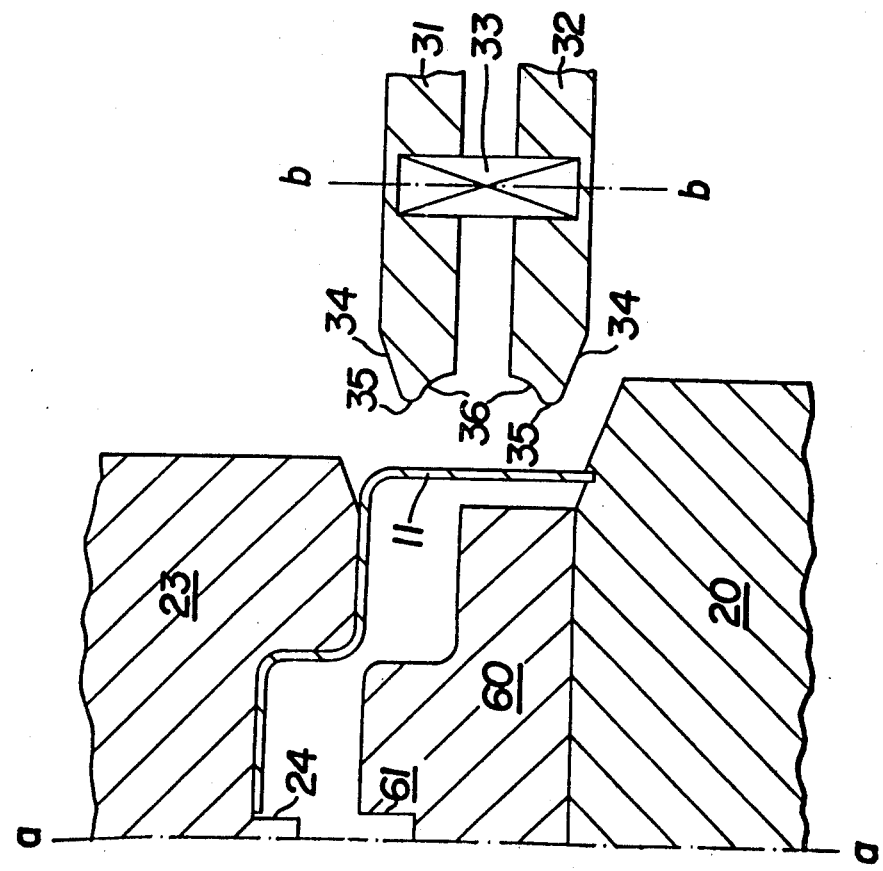

METHOD OF PULLEY MANUFACTURE AND PRODUCT

This is a Continuation of application Ser. No. 850,356 filed Nov. 10, 1977 now abandoned.

This application relates to a method of thickening sheet metal in selected areas. In a more preferred embodiment, this application relates to a method of making pulleys from sheet metal.

The method of making pulleys from sheet metal has long been known. Such pulleys are often made by a metal spinning process, such as that shown in Wickwire et al, U.S. Pat. No. 2,685,856, dated Aug. 10, 1954, or Harrison et al, U.S. Pat. No. 1,828,464 dated Oct. 20, 1931. Both of these patents show making of pulleys with a single v-groove, which can be used to contain and provide power to a v-belt. It is possible also to make pulleys having two v-shaped grooves by a metal spinning process, as shown in U.S. Pat. No. 2,892,431 of Killian et al, dated June 20, 1959. However, this involves more complicated machinery, and is also subject to difficulty because the formation of the v-grooves causes metal flow, leading to thinned portions of the pulley wall around the v-grooves which may lead to failure of the pulley in operation.

It has been proposed to form pulleys having more than two v-grooves by the use of metal dies, as has been disclosed in U.S. Pat. No. 3,368,376 of Previte, dated Feb. 13, 1968. However, this process would require complicated dies with expanding arcuate segments, and has not, as far as the applicant is aware, ever been used commercially.

The formation of v-grooves in the side of a pulley in any of the aforesaid processes can lead to thinning of the pulley wall, and therefore failure of the pulley. One reason for this is that a considerable amount of metal flow must necessarily occur in these processes, and it is difficult to guide this flow in such a way that all portions of the finished v-groove in the pulley are of adequate thickness. Accordingly, it is necessary to start from a fairly heavy guage metal, so that the final pulley will be of sufficient strength to resist the torsional stresses which would tend to drive it out-of-round in operation.

The existing spun pulleys have been usable with respect to single v-belts, which are belts having one flat side and one side shaped in an outwardly pointing vee configuration. However, for many years, other belts, known as poly v-belts, have been used in a number of operations, such as for the powering of specialized machinery. These belts have one flat side and a plurality (usually six) of vee portions extending outwardly on the opposite side, in a saw-tooth pattern. The production of pulleys to engage such belts has been difficult, as the saw-tooth like configuration of a poly v-belt requires a number of sharply pointed vee configuarations on the pulley, in relatively close proximity to one another. This uses up a great deal of metal. Accordingly, a relatively thick walled pulley can must be used if traditional metal spinning techniques, or a die stamping technique such as that of Previte, is to be employed. The resulting pulleys would be heavy and expensive to make, and have not found favour in automobile manufacture, where low cost and weight reduction are desirable for commercial acceptance. The lack of effective, low cost, light-weight pulleys has prevented the widespread adoption of poly v-belts by the automobile industry, despite other inherent advantages which have been recognized for such belts.

In most spinning or die-stamping methods, the pulley blank is formed initially by drawing a flat piece of metal into a shape having a base and an upstanding cylindrical wall. This blank is commonly known as a "can". The pulley grooves are rolled or die-stamped into the wall of the can. Accordingly, the initial flat piece of metal must be chosen to be of a sufficient thickness so that the can wall, after drawing, is of sufficient thickness to make v-grooves of adequate strength for the intended application. However, the drawing process produces a wall which is either the same thickness as, or slightly thinner than, the base. Accordingly, in the present processes, the minimum thickness permissible for the starting piece of metal is determined by the minimum thickness tolerable in the walls of the can. As the can base is subjected to lesser stresses than the wall during formation of the pulley, it need not be as thick or strong as the wall. It would therefore be advantageous in many cases, from a cost point of view, to provide a pulley can which has a wall which is thicker than its base.

Accordingly, it is the object of the present invention to provide a method for thickening the approximately cylindrical wall portions of a pulley blank or "can" without thickening the base portions of that can, so that the wall portion will be more robust and thicker than would otherwise be possible with the thickness of sheet metal used to form the pulley can. It is another object of the invention to prepare pulleys having at least four v-grooves in their sides, such v-grooves having relatively sharp bottoms to their vees. It is another object to form a generalized method of thickening the sheet metal of vertical walls of a drawn can, so as to strengthen the vertical upstanding walls. It is another object to provide light-weight, strong pulleys for the purpose of powering poly v-belts in automobiles.

Having regard to these objects, the invention in one of its aspects comprises a novel sheet metal pulley blank having a substantially circular base and a substantially cylindrical wall upstanding from the circumference of the base and formed from the same piece of sheet metal as the base, a substantial portion of the wall having a metal thickness greater than the metal thickness of at least the major portion of the base.

Another aspect of the invention provides a method of forming a novel pulley blank, which method includes the steps of;
  (a) providing a pulley blank formed of sheet metal and having a circular base and a cylindrical wall upstanding from the circumference of the base,
  (b) partially, but not completely, collapsing said wall in an axial direction,
  (c) contacting the partially collapsed wall externally with the cylindrical face of a roller, said roller and said pulley blank being rotatable and one of them being caused to rotate, said roller and said blank being contacted with sufficient force such that both rotate and the cylindrical face of said roller deforms and thickens the wall.

Another aspect of the invention provides a novel method of forming a pulley, which comprises:
  (1) providing a pulley blank formed of sheet metal and having a circular base and a cylindrical wall upstanding from the circumference of the base,
  (2) partially, but not completely, collapsing said wall in an axial direction, (3) contacting the partially collapsed wall externally with the face of a roller having at least four parallel ridges around its circumference while supporting the wall internally, the pulley blank and the roller being rotatable and one of them being caused to rotate, said roller and said blank being contacted with sufficient force such that both rotate and the ridged circumference of the roller imparts a pattern of v-grooves to said wall, whereby to form a pulley.

In another aspect of the invention, a novel pulley is formed by carrying out method steps (a), (b) and (c) as described above, followed by step (3) described above.

The invention will be further described with respect to the drawings in which:

FIGS. 6a and 6b show a partial cross-sectional view of the can of FIG. 2, illustrating successive steps of an alternative way of collapsing the can partially.

Figure 1:
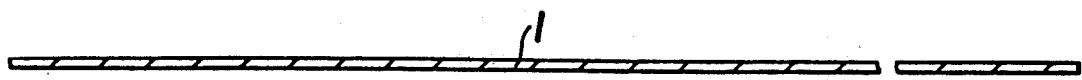
FIG. 1 represents a sheet of sheet metal which is usable to form a pulley can.

In its simplest form in manufacturing a pulley suitable for poly v-belt use on automobiles, a pulley can is formed by deep drawing or spinning, in a conventional way, a sheet of flat metal. The particular sheet metal can be any of those conventionally used in spun pulley manufacture. The most common of these are sheet aluminum and hot rolled, commercial quality, low carbon sheet steel. The sheet of sheet metal, such as shown in FIG. 1, has for example a thickness of 0.080 inch. Thicker sheet metal can of course be used, and the upper limit to thickness depends upon the ultimate use envisaged for the pulley to be made, and the pressures able to be exerted by the drawing and spinning equipment to be used. The use of thin sheet metal (i.e., between 0.070 inch and 0.110 inch in thickness) is preferred as the particular advantages of the present invention are much more pronounced when thin sheet metal is used, as then the invention provides pulleys from such thin sheet metal which have performance characteristics which could otherwise have only been obtained from pulleys made of a thicker grade of the particular sheet metal.

Figure 2:
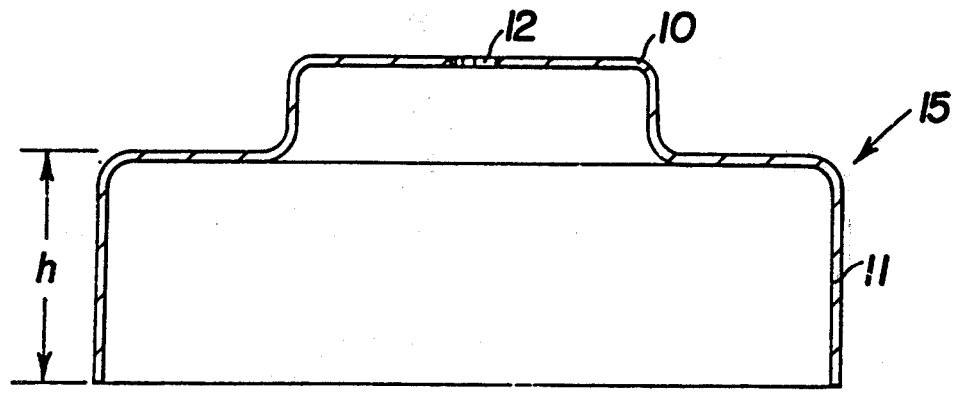
FIG. 2 is a cross-sectional view of one form of a pulley can formed from the metal of FIG. 1.
Figure 2A:
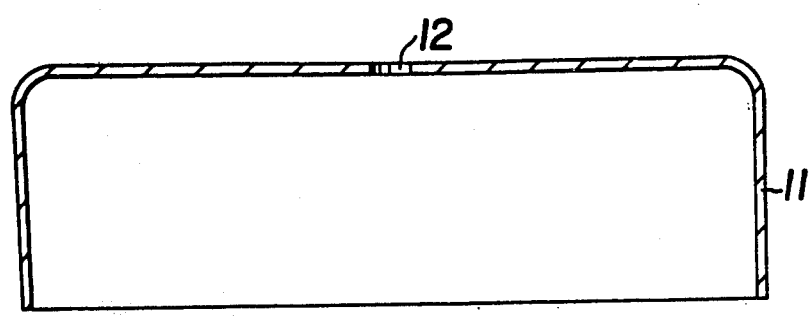
FIGS. 2a and 2b show cross-sectional views of alternate forms of the base of the pulley can.
Figure 2B:
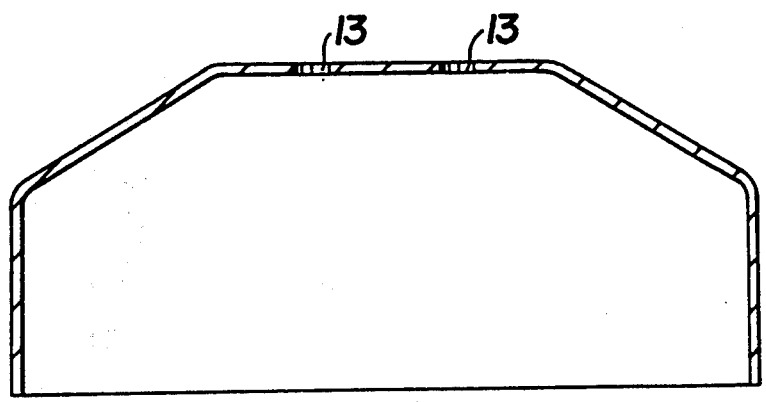

As stated above, a pulley blank (which is henceforth called a "can") is made according to conventional methods on a conventional deep drawing or rolling machine. Such a machine stamps a circular portion out of a sheet of sheet metal 1 (FIG. 1) and draws it into a can having a base, and an upstanding cylindrical wall. The can may be of any desired dimension, depending upon the size of the equipment being used, and the size of the required final pulley. For example, for six inch pulleys (a size often used in automobiles) a circular piece nine inches in diameter is stamped out, and is drawn into a can with a 6.6 inch diameter base and a two inch high wall. A typical can is shown as 15 in FIG. 2. The can of FIG. 2 has a stepped base portion 10 and upstanding cylindrical wall 11. The base portion 10 is usually pierced in its center by a hole at 12 in conventional manner, to provide for registration on metal spinning equipment. Other holes may be pierced for registration purposes or for use as bolt holes when the pulley is completed. Additionally, the shape of the base 10 of the can need not be stepped as shown in FIG. 2, but may instead be of flat or sloped configuration as shown in FIGS. 2a and 2b. Instead of a single hole, several holes may be pierced in the base in any desired pattern, as shown at 13 in FIG. 2b. If desired, the pulley blank may be fitted with a hub formed of a separate piece of metal, as for example shown in U.S. Pat. No. 2,696,740 issued Dec. 1, 1954.

According to the method of the invention, the can is placed in a conventional, general purpose, metal spinning machine. Such machines are available commercially, and will not be illustrated here. As is usual, the machine is provided with chucks to hold a workpiece for rotation and with tool holders to move selected tools toward and away from the axis of rotation of the workpiece. The machine is also capable of compressing a workpiece along its axis of rotation.

Figure 3:
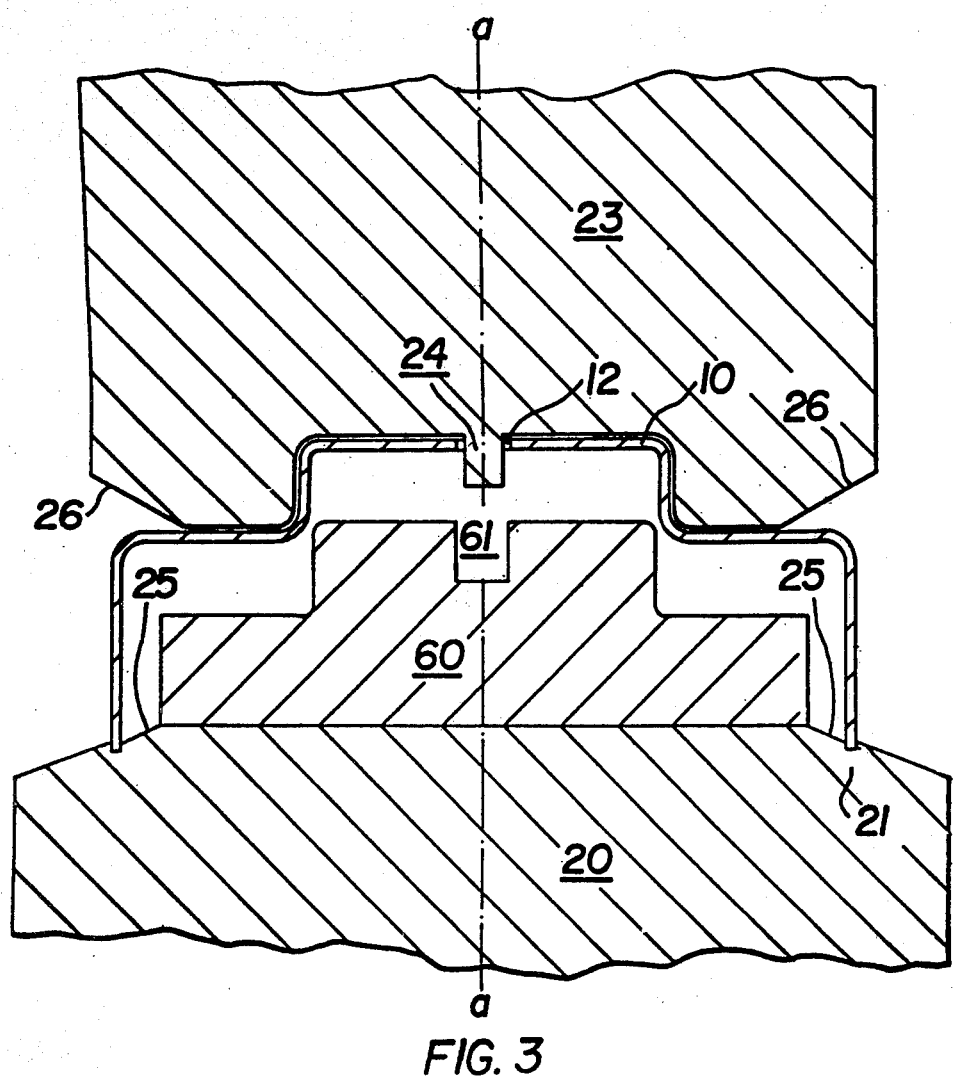
FIG. 3 shows a cross-sectional view of the pulley can of FIG. 2 mounted in a conventional metal spinning apparatus.

FIG. 3 shows a can of the form of FIG. 2 positioned in a metal spinning machine between bottom chuck 20, and top chuck 23. The axis of rotation of the can is shown by the line a—a through the chucks and the can. As is common in the pulley spinning art, the can is correctly oriented so that its axis of rotation is the centre axis of the cylindrical can wall. Such orientation can be achieved by means of a can holding groove 21 in the bottom chuck 20, and a central spindle 24 extending from chuck 23 and engaging hole 12, or by any other known means.

If desired, cylindrical internal support block 60 may be secured to the chuck 20 for rotation therewith. The block 60 has an indentation 61, to house spindle 24 when chucks 23 and 20 are moved together a predetermined distance.

It is preferred, for reasons to be described later, that the inner side of groove 21 be sloped, rather than vertical, as indicated at 25 in FIG. 3. Top chuck 23 also has a sloping annular portion 26 facing the slope 25, also as shown in FIG. 3.

If desired, a step of forming outer and inner flanges in the pulley wall can be carried out before thickening of the wall and forming the grooves in it. Such a step is not absolutely necessary, as flanges can conveniently be formed during the course of subsequent steps of pulley formation, as will be described. However, it is sometimes convenient to form the flanges first, as this may permit better control of the partial collapse of the pulley wall, as described later.

Figure 4A:
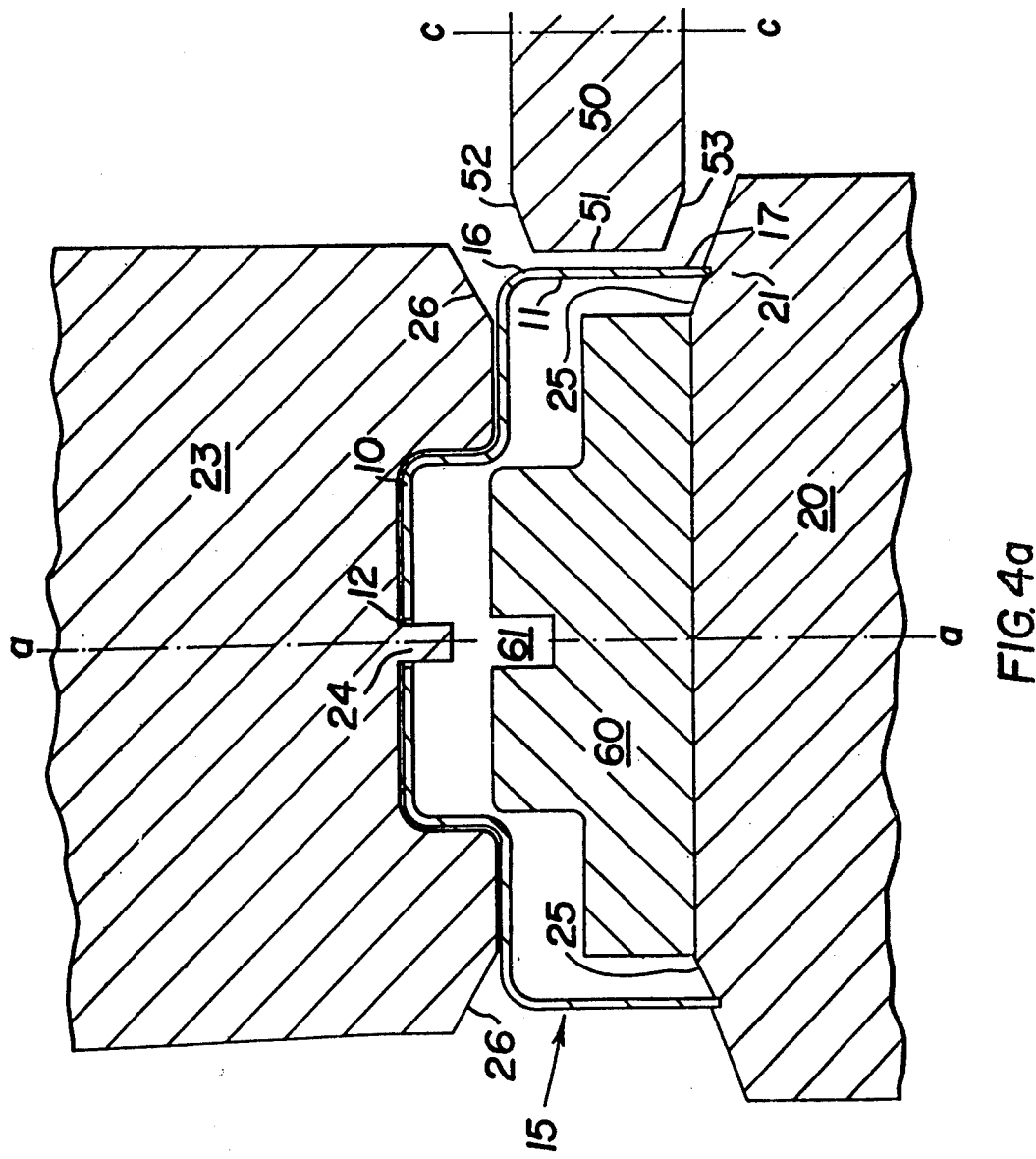
FIG. 4a shows a partial cross-sectional view of the can of FIG. 2
Figure 4B:
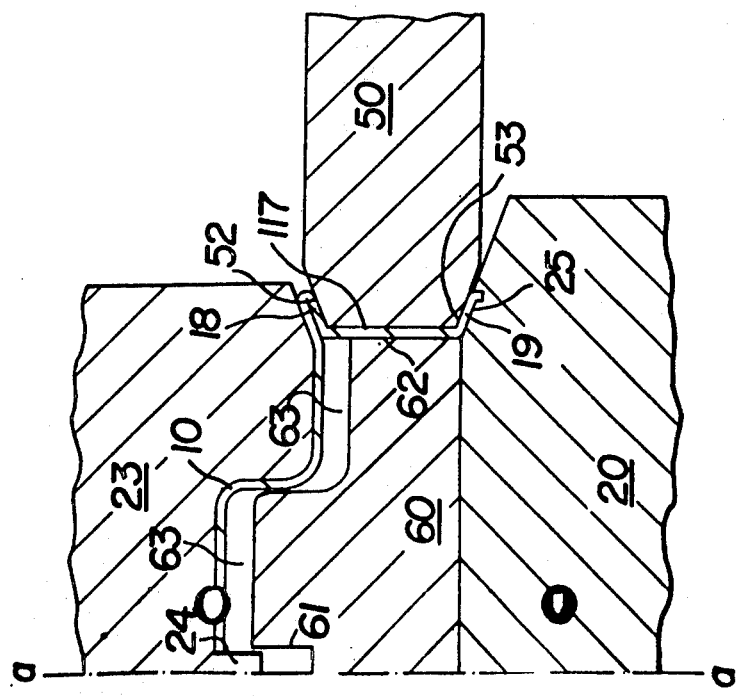
FIG. 4b shows a partial cross-sectional view of the same can, illustrating a flange-forming step which can optionally be performed prior to partial collapsing of the can.

The step of flange formation is shown in FIGS. 4a and 4b. FIG. 4a shows a can positioned as shown in FIG. 3, but with a roller 50 approaching it. The roller 50 is rotatable about an axis c—c parallel to a—a and is movable toward and away from axis a—a. The roller 50 has a generally cylindrical smooth outer face 51, and two sloped portions 52 and 53 each adjacent to the cylindrical face 51 as shown in FIG. 4a. Alternately, the face of the roller can be slightly concave if desired. As is known in the art, such a roller can be mounted on springs, so that it can move axially up and down slightly in response to pressures on its periphery. In the example shown, the roller is unpowered.

The chucks 20 and 23 are rotated simultaneously, at the same speed and in the same direction, carrying with them the can 15 and block 60. As this rotation is occurring, the roller 50 is moved into contact with the wall 11 of the can 15. Simultaneously, chuck 23 is moved downwardly a predetermined distance, so that, as the face 51 contacts the can wall 11 and continues to move inwardly, the metal at the join between base 10 and wall 11 (shown at 16) is folded over by the pressure of the roller 51 bearing against the can. The sloping portion 52 of the roller helps fold over the metal at 16 smoothly, to form a flange. Similarly, the sloping portion 53 helps form a flange smoothly at the end 17 of the can wall which is most remote from the base. The roller 50 is moved inwardly toward the axis a—a a predetermined amount, having regard to the amount of downward movement of the chuck 23, so that the areas 16 and 17 of the wall 11 are folded into the position shown in FIG. 4b, without undue stretching. Preferably (but not necessarily) the internal block 60 extends outwardly just sufficiently so that its external face 62 provides a backing support for the wall 11, when the roller 50 is at the innermost limit of its travel toward the axis a—a. It is preferred, however, that the block 60 should be of such a height that there is a gap, indicated as 63 between the base 10 and the block 60 after this operation, so that the chuck 23 can be moved in subsequent steps of the pulley formation closer to the chuck 20, without the necessity of changing blocks 60. However, instead of leaving a space 63, it is also possible to dispense completely with the block 60 during the step shown in FIGS. 4a and 4b, or else, after completion of the step shown in FIGS. 4a and 4b, to remove the block 60 and replace it with a block having a smaller vertical height, before going on to further steps.

The steps shown in FIGS. 4a and 4b create two flanges, 18 and 19, with a flat portion 117 between them. It will be noted that the flange 19 lies along the sloping portion 25 of the chuck 20 and is in fact formed between the sloping portion 53 of the roller 50 and the sloping portion 25 of the chuck 20. The slope of portion 25 should be pre-chosen so that it will provide a smooth back to assist in formation of flange 19.

As stated above, the step shown in FIGS. 4a and 4b is optional. It has the effect of accurately sizing two flanges 18 and 19, which flanges are found to be useful in pulleys for poly v-belts, as they help to retain the poly v-belt in position when the pulley is ultimately formed. In the subsequent description, it will be assumed that the step of flange formation as shown in FIGS. 4a and 4b has not been carried out, but it will be understood by one skilled in the art that the steps to be described can be carried out with a pulley blank having flanges 18 and 19 as obtained from the carrying out of the steps shown in FIGS. 4a and 4b.

If the step of FIGS. 4a and 4b is not carried out, the first step to be performed on a pulley can in the process according to the invention is the partial collapsing of the wall 11 of the pulley can 15. Such partial collapsing can be carried out in several ways. One way (which is not preferred) is by a step of bulging the can as shown in U.S. Pat. No. 2,929,345 of Zatyko, dated Mar. 22, 1960. This step is not preferred as it requires special equipment, which must be specially mounted on the spinning machine for the purpose of the step, and subsequently removed so that other steps can be carried out. An alternative, and also not preferred manner, is simply to apply axial pressure to the chuck 23, causing the wall 11 to buckle, as shown at 112 in FIG. 5. The buckling occurs in an irregular manner. The block 60 need not be present during the operation of partial collapse of the wall 11 to the approximate shape shown at 112, but it can be present if desired. As will be obvious to one skilled in the art, the irregular buckling could also be carried out after flanges 18 and 19 have been formed by the method shown in FIGS. 4a and 4b.

An alternative, and preferred manner of partially collapsing the wall 11 is shown in FIGS. 6a and 6b. FIGS. 6a and 6b show a pair of rollers 31 and 32, which rotate about an axis b—b. These rollers are separated from one another by a compression spring 33. Each of the rollers has a face with a sloping portion 34, a blunt extension 35, and a curved portion 36, which is located nearest the other roller. The two rollers are separated by the spring 33 a distance such that the projections 35 will engage wall 11, when the rollers 32 and 33 are moved together toward the wall, at fairly widely spaced points on wall 11.

In the partial collapse of the can wall according to the method of FIGS. 6a and 6b, the chucks 20 and 23 are powered to rotate the can 11, and the rollers 31 and 32 are moved into contact with the can 11. As the rollers contact the can 11, they will of course, begin rotating as well, as the rotation of the can 11 will cause them to rotate. The projections 35 will of course be the first portions of rollers 31 and 32 to contact the can wall 11. As soon as the portions 35 have contacted the wall, the chuck 23 is moved toward the chuck 20, at the same time as the rollers 32 and 31 are moved together toward the axis a—a. This will cause the can wall 11 to buckle, and, at the same time, the buckling will be controlled somewhat by the fact that the projections 35 will tend to stay in contact with the same portion of the can wall that they they originally contacted, with the spring 33 compressing as the chuck 23 moves toward the chuck 20. This will cause the can wall to lie along the contour of the curved roller face 36, as shown in FIG. 6b. The amount by which the rollers 31 and 32 should approach the axis a—a, and the design of the contours 36 and the amount of movement of the chuck 23 will be obvious to a man skilled in the art. It is generally preferred to have the rollers 31 and 32 end up in face to face contact with one another, so that no point or burr on the metal is formed by a gap between the two faces 36, such as indicated at 37. However, if a burr or point is formed, this is not detrimental, as it will be removed during the later processing steps. After the rollers 31 and 32 are withdrawn further controlled collapse can be carried out by moving the chucks 20 and 23 closer to one another by a desired amount.

The form of partially collapsed wall formed by the method of FIGS. 6a and 6b is shown in FIG. 6b at 113. It will be noted that the shape of the collapsed wall is somewhat more regular than is formed by the method of FIG. 5. Hereinafter, further steps of the invention will be described with respect to a wall of form 112, but it is understood that this disclosure applies equally to a wall of form 113.

Figure 5:
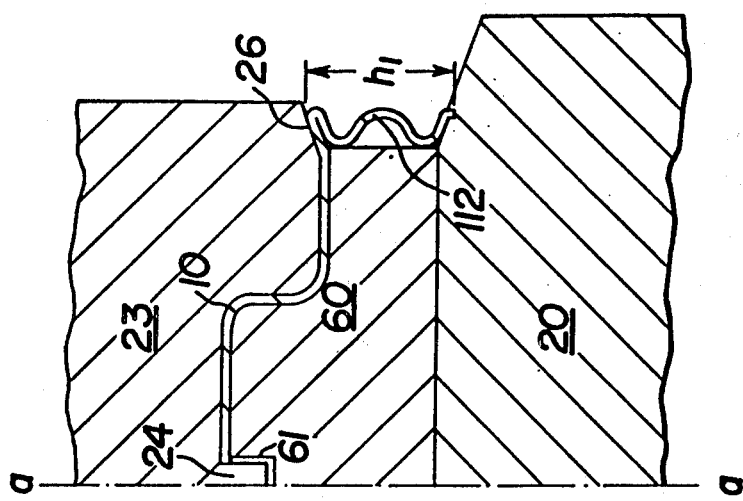
FIG. 5 shows a partial cross-sectional view of the can of FIG. 2, showing one method of collapsing the can partially.

No matter which method is used to collapse the wall, it is preferred that the wall 11 be collapsed so that is final height ($h_1$) (see FIG. 5) is from 25% to 75% of its original height h (see FIG. 2). If a flange has been formed by the step of FIG. 4 prior to the collapse, the "collapsed" height $h_1$ includes the height of the flanges 18 and 19. Conveniently, the height of block 60 is such that, after collapse has occursed by the desired amount, the block is in contact with the base 10 of the can, as shown in FIGS. 5 and 7a.

Figure 7A:
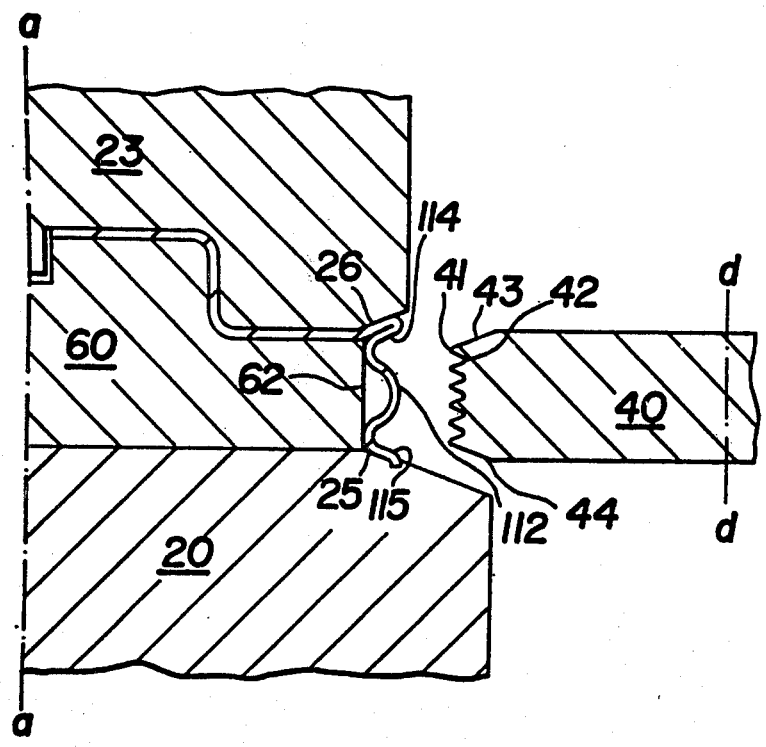
FIGS. 7a and 7b show successive steps in the forming of v-grooves in a partially collapsed can.
Figure 7B:
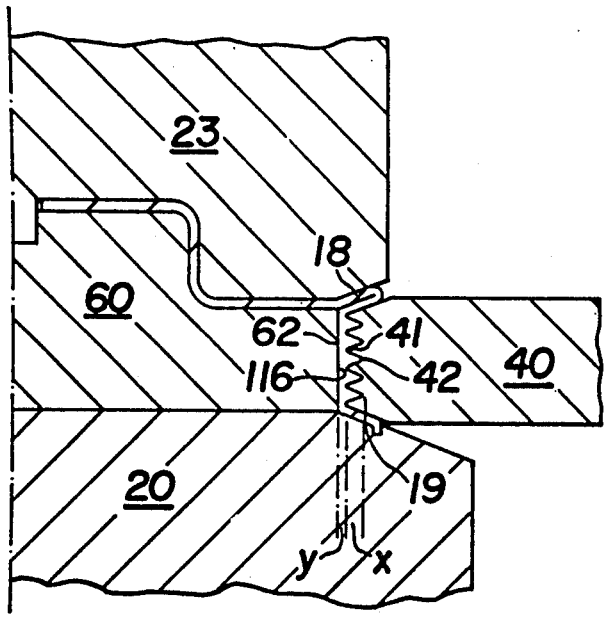
Figure 8A:
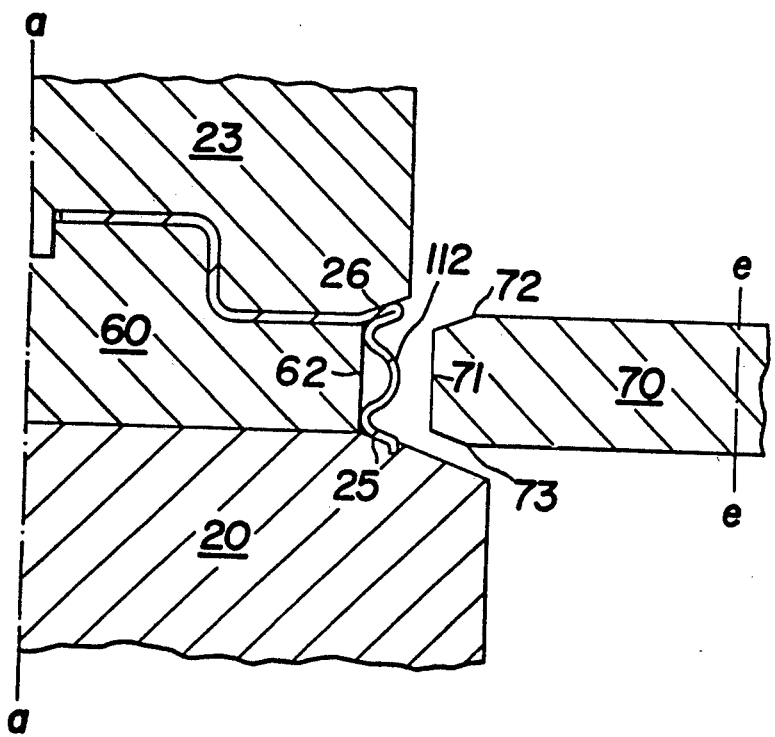
FIGS. 8a and 8b show successive steps in thickening the walls of a partially collapsed can without forming v-grooves.
Figure 8B:
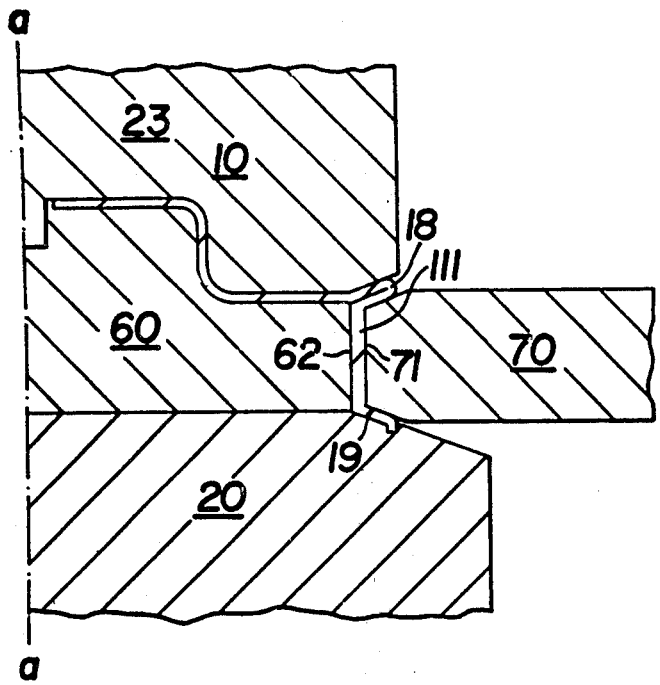
Figure 9:
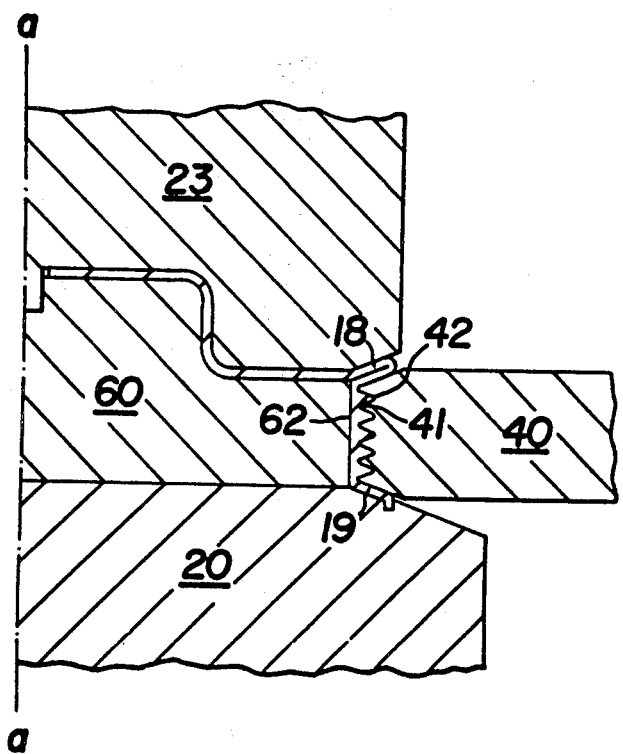
FIG. 9 shows the formation of v-grooves in a can after the step of FIG. 8.

Once the wall has been collapsed into the shape 112 or 113, the operator can, according to the invention, either perform on it the steps of FIGS. 7a and 7b to obtain a final pulley suitable for use with a poly-v-groove belt, or else the steps of FIGS. 8a and 8b to obtain a pulley having a thickened upright wall and which is suitable for use with a flat belt. If the steps of FIGS. 8a and 8b are carried out, a subsequent step can (if desired) be carried out as is shown in FIG. 9, to convert the pulley thus formed into one suitable for use with a poly v-belt.

Referring now to FIGS. 7a and 7b, one method of forming a pulley suitable for use with a poly v-belt from a collapsed can having the configuration 112 or 113, will now be described. FIG. 7a shows a roller 40, which rotates about an axis d—d, parallel to the axis a—a. The face of roller 40 is provided with a number of sharp projections 41, spaced from one another by v-shaped indentations 42. The number and shape of projections 41 is the same as the number and shape of projections on the poly v-belt with which the pulley to be made is intended to be used. In the example shown in FIG. 7a, there are six projections 41 separated by five indentations 42, in the same configuration as is used in a common type of v-belt. The top of the roller 40 has a sloped transition surface 43 between its face and its top. Similarly, there is a sloped transition surface 44 between the face and the bottom of the roller.

The chucks 20 and 23 are set into motion simultaneously and in the same direction, causing the partially collapsed can to rotate. The axis d—d is then moved toward the axis a—a. When the face of the roller 40 comes in contact with the can, the roller also begins to rotate. The surface 43, as it engages the can, squeezes a portion 114 of the metal of the can wall against the sloped surface 26 of upper chuck 23, forming a flange. Similarly, the sloped surface 44 squeezes a portion 115 of metal against the sloped surface 25 of bottom chuck 20, forming a bottom flange. These two flanges are identical with the flanges formed at 18 and 19 in the step described with respect to FIG. 4. If the step of FIG. 4 has been carried out, and the flanges are already formed, the sloped portions 43 and 44 merely nest against the pre-existing flanges, and do little, if any, deformation of metal.

The sharp projections 42 cut into the metal of the can wall 112, and deform it. If the can wall were not partially collapsed, i.e., if it were in the same state as is shown in FIG. 2 at 11, the sharp projections would cut deeply into the thin sheet metal of the wall. If the sheet metal were relatively thin, i.e., below about 0.110 inch, and the depth of the indentations 42 from the projections 41 was approximately 0.125 inch, insufficient metal would flow into the indentations 42 to fill such indentations before the sharp projections 41 cut entirely through the metal of wal 11, or else approached so nearly to cutting through the wall as to render the wall 11 extremely weak. However, according to the method of the invention, the collapsed portion 112 of the wall provides more metal than a straight cylindrical wall would do. This gives sufficient metal, even when sheet metal of initial thickness of 0.080 inch is used, to fill completely 0.125 inch indentations at 42, while still retaining a strong wall.

The roller 40 is moved towards axis a—a until the indentations 42 have all been filled with metal. The final form of the can wall is shown in FIG. 7b. It will be noted that there is an appreciable thickness of metal indicated by the distance y between the points 41 and the inside 116 of the can wall which now rests firmly against the exterior wall 62 of the backing block 60. The indentations 42 are fully filled with metal of the wall, as shown by the dimension x. Generally speaking, where the height $h_1$ is from 0.25 to 0.75 of the height h, a thickness of wall plus projections (dimensions y plus x in FIG. 7b) of from about 1.5 to 2.5 of the thickness of the original sheet metal can be obtained for sheet metals in the thickness range of about 0.070 inch to 0.130 inch. The relative size of dimensions y and x will of course depend on the size, shape and number of projections 42, and upon how close to the wall 62 the roller 40 is allowed to approach. In order to obtain a strong pulley, for use in an automobile, the roller 40 is allowed to approach the wall 62 only closely enough so that the minimum wall thickness y will be 0.040 inch. A smaller minimum thickness would of course be permissible if the pulley were designed for uses requiring less strength.

During the operation of FIG. 7, the backing block 60 is extremely important, as its wall 62 assists in distributing the metal of can wall 112 so that it fills all of the indentations 42.

After the roller 40 has come to the position of FIG. 7b, it is removed, and the pulley can, which has now been fully formed into a pulley suitable for use with a poly v-belt, is removed. It will be noted that the pulley, thus formed, has two flanges, 18 and 19, which give it considerable dimensional stability, and has a series of grooves (the mirror image of projections 41 and indentations 42 of the roller) for use with a poly v-belt.

An alternative arrangement, for use in making a pulley with a flat face, is shown in FIGS. 8a and 8b. Turning first to FIG. 8a, a roller 70, rotating around an axis e—e which is parallel to axis a—a is shown. This roller has a flat face 71 and two sloped portions 72 and 73. Portion 72 joins the flat face 71 to the top of the roller, whereas portion 73 joins the flat face to the bottom of the roller. The width of the face 71 is just slightly smaller than the width of the face 62 of backing block 60, and the slope of the sloped surfaces 72 and 73 are chosen having regard to the slopes of surface 26 and 25 with which they will co-act to form flanges.

The chucks 20 and 23 are caused to rotate simultaneously and in the same direction, carrying the can 20 with them. The axis e—e of the roller 70 is caused to move toward the axis a—a, with the roller oriented opposite the can as shown in FIG. 8a. The flat face 71 contacts the collapsed portion 112 of the can wall, pushing it against wall 62 of backing block 60. Simultaneously, sloped surface 72 of roller 70 squeezes a portion of the metal of the can wall against surface 26 of chuck 23, to form a flange, and surface 73 squeezes a portion of the metal of the can wall against sloped surface 25, also forming a flange. Because of the bulged or partially collapsed surface of the wall of the can, there is more metal than would be needed merely to make a flat wall of the same thickness as the metal of the base. Thus, when the roller 70 approaches the wall 62, a thick, smooth wall of metal 111 is formed, having smooth surfaces against faces 71 and 62. The advance of the roller 70 is stopped at a predetermined place having regard to the amount of collapse which has been carried out in forming the buckled or collapsing wall 112, such that the newly formed wall 111 will be of a desired thickness. Generally, the thickness obtained will be somewhat in excess of the sheet metal forming the base 10 (excluding any strengthening members or hubs) such as about from $1\frac{1}{4}$ to 2 times (preferably $1\frac{1}{3}$ to $1\frac{1}{2}$ times) the thickness of the base 10. Obviously, if the roller 70 were advanced closer to the axis a—a, excess metal could squeeze out around the edges of the roller, leading to a thinner wall 111, but this would not be desirable, and does not form part of this invention. Having regard to the teachings herein, a person skilled in the art can easily determined the amount of collapse required to give a suitable thickness 111, as he may require.

If the flanges 18 and 19 have been preformed, as shown in FIGS. 4a and 4b, then the faces 72 and 73 will not in themselves form flanges, but will merely mate smoothly against the pre-existing flanges 18 and 19, preventing metal from escaping from the area between face 62 and face 71, where the new, thicker wall 111 is being formed.

After the condition shown in FIG. 8b has been reached, the roller 70 is withdrawn, and the pulley can is removed from the chucks 20 and 23. A pulley can having a smooth, robust wall 111 has been formed, which is suitable as a pulley for a flat belt. The pulley also has flanges 18 and 19, which serve to retain the belt in place.

It will be noted that the steps of FIGS. 7 and 8 each result, intrinsically, in a pulley having flanges 18 and 19. Generally, it is preferred to retain these flanges, and one of the advantages of the invention is that the flange reduces the possibility of slippage of v-belts from pulleys, formed according to the invention. However, it is possible, if desired, to remove the flanges 18 and 19 by means of a roller which nips off the flanges (as is known in the spun pulley art for removing unwanted flanges or burrs) or by other conventional methods. Therefore, although the flanges form a very desirable part of the invention, it is understood that unflanged pulleys also can be made by a process according to the invention.

If desired, instead of removing the pulley as formed with wall 111 from the chucks 20 and 23, the pulley can instead be subjected to the application of roller 40, as shown in FIG. 9. following the steps shown in FIGS. 8a and 8b. The roller 40 approaches in a manner similar to that described with respect to FIGS. 7a and 7b, but, on this occasion, it engages flat, thick wall 111, rather than the buckled wall 112. However, the result obtained is the same as was obtained by the steps described in FIGS. 7a and 7b, as can be seen by comparing FIG. 9 to FIG. 7b.

In the foregoing disclosure, the contacting of the various rollers with the surface of the can wall has been accomplished by rotating the two chucks 20 and 23 at the same speed and in the same direction, entraining the can 15 along with them. The roller or rollers which then contact the surface of the can wall (such as, for example, roller 40 or roller 70) are freely rotatable, but are not powered. When they contact the can wall, they are caused to rotate by their contact with the rotating can, at the same speed as the rotating can. It is, of course, within the scope of the invention to have the chucks 20 and 23 freely rotatable, and instead to power the roller which approaches the can wall. Alternately, (although this is not preferred) both the roller and the chucks 20 and 23 could be powered so that both the can and the roller are caused to rotate. The directions of rotation should preferably be such that, at the point of contact of the roller and the can, the two are moving in the same direction. However, they need not be moving at exactly the same speed, and, under some circumstances, it is even possible to obtain good results with the can and the roller moving in different directions, although this is not preferred.

Certain examples of the making of pulleys according to the disclosure given herein will now be given.

EXAMPLE I

A can of the form shown in FIG. 2 is drawn by conventional means from sheet steel of thickness 0.080 inches to have a width of 6.6 inches and a height h of 2.0 inches. The can is collapsed according to the step shown in FIG. 5 to a height $h_1$ of 1.0 inch. The method steps with respect to FIG. 7a and 7b are then preformed on the can using a roller 40 having six grooves spaced 0.140 inches from one another and having a depth of indentation 42 of 0.140 inches. The roller 40 is moved toward axis a—a until the distance between wall 62 and the projections 42 is 0.050 inches. When the roller 40 is removed and the can is removed from the chucks, it is found to be a well formed grooved pulley having two flanges (18 and 19 in the drawings) of approximately 6.6 inches in diameter and a central v-belt receiving portion having an average diameter of 6.0 inches and having six grooves corresponding to projections 41. Each of these grooves is 0.140 inches in depth, and the total depth of metal measured from the bottom of a vee to the inside of the can (the distance y in FIG. 7b) is 0.050 inches. The variation of depth between the six v-grooves is insignificant, being less than 0.002 inches. The dimensions are substantially constant around the diameter of a pulley.

EXAMPLE II

A sheet of sheet steel 0.080 inches in thickness is preformed into a can of the same shape as that described in Example I. The can is collapsed according to the step shown in FIG. 5 to a height $h_1$ of 1.0 inch. The steps illustrated in FIGS. 8a and 8b are carried out on the can. The roller 70 is allowed to approach the wall 60 such that the distance between face 71 and face 62 is 0.120 inches. When the roller 70 is withdrawn, and the can is removed from the chucks 20 and 22, it is found to have a v-belt receiving portion 6.0 inches in diameter and two flanges approximately 6.6 inches in diameter at each side of the v-belt receiving portion. The thickness of the wall of the v-belt receiving portion is 0.120 inches, and the pulley is smoothly cylindrical in its v-belt receiving portion.

EXAMPLE III

A pulley formed according to the teachings of Example II is treated by a subsequent step as illustrated in FIG. 9 and the associated disclosure. The roller 40 is permitted to approach so that the projections 42 are a distance of 0.050 inches from the face 62. When the roller is withdrawn and the can is removed from the chucks 20 and 23, a poly v-belt pulley which is indistinguishable from the pulley formed in Example I is formed.

Each of the pulleys formed in Examples I, II and III is found to be highly resistant to being forced out of round, and is judged to be suitable for automotive and indeed heavy truck applications.

It is understood that the invention is not limited to the exact roller structure shown, nor to the exact pulley shapes illustrated, because the particular shapes of the rollers can be varied to provide other structural embodiments without departing from the scope of the present invention.

Having now described the features of the invention, and the construction and operation of the preferred embodiments of the novel method and the products provided by them, the inventor wishes it understood that the protection claimed is not limited to the exact embodiments shown, but includes such modifications thereof as will be obvious to persons skilled in the art, and that the protection claimed is therefore limited only as set out in the appended claims.

What is claimed is:

1. A poly v pulley formed from a pulley can blank of sheet metal of a predetermined minimum permissible thickness comprising:

a circular base of a wall thickness equal to said predetermined minimum permissible thickness, and an integral annular wall portion having a generally smooth cylindrical interior peripheral surface and an exterior peripheral surface shaped to operatively engage a poly v-belt, said wall portion having a cross-sectional configuration defined by metal cold flow which is straight along its interior periphery and has a plurality of v grooves in its exterior periphery, the distance between the trough of each v groove and said straight interior periphery being sufficient to provide required strength but less than the predetermined minimum thickness of said sheet metal can blank, the cross-sectional area of said wall portion being greater than the cross-sectional area of a section of said sheet metal can blank of said predetermined thickness having a length equal to the axial extent of said wall portion whereby said pulley contains less metal and weighs less than a pulley with a similarly configured wall portion made from a can blank of the same metal having a thickness such that a length thereof equal to the axial extent of said wall portion has a cross-sectional area equal to or slightly greater than the cross-sectional area of said wall portion.

2. A poly v pulley as defined in claim 1 wherein said annular wall has formed integrally along opposite ends thereof a pair of flanges which extending radially and axially outwardly beyond the exterior periphery of said wall portion, one of said flanges being formed from an annular section of said can blank folded upon itself.

3. A poly v pulley as defined in claim 1 or 2 wherein the distance between the trough of each v-groove and said straight interior periphery is at least 0.040 inches.

4. A poly v pulley as defined in claim 3 wherein the plurality of v-grooves define at least four annular projections each of which is of inverted v-shaped configuration, the perpendicular distance from said straight interior periphery to the crest of each annular projection being from 1.5 to 2.5 times said predetermined minimum thickness.

5. A poly v pulley as defined in claim 1 or 2 wherein the cross-sectional area of said wall portion is greater than the cross-sectional area of a section of said sheet metal can blank of said predetermined thickness having a length equal to the axial extent of said wall portion by a factor of from 1¼ to 2.

6. A poly v pulley as defined in claim 5 wherein said factor is 1⅓ to 1½.

7. A poly v pulley as defined in claim 5 wherein the distance between the trough of each v-groove and said straight interior periphery is at least 0.040 inches.

8. A poly v pulley as defined in claim 7 wherein the plurality of v-grooves define at least four annular projections each of which is of inverted v-shaped configuration, the perpendicular distance from said straight interior periphery to the crest of each annular projection being from 1.5 to 2.5 times said predetermined minimum thickness.

9. In a method of making a pulley from a pulley can blank of sheet metal of a predetermined minimum permissible thickness in which a circular base is formed from said pulley can blank with a thickness equal to said predetermined minimum permissible thickness, the improvement which comprises forming integral with said base a thickened annular wall portion from said pulley can blank which has a thickness greater than said predetermined minimum thickness, said thickened wall portion being formed by partially collapsing an annular section of the pulley can blank having an axial extent greater than the axial extent of said annular wall portion to an axial extent equal to that of said annular wall portion without materially changing the thickness thereof but not completely such that interior surface portions thereof are interengaged, and moving the partially collapsed section of the pulley can blank radially inwardly while restraining the same against axial expansion and radially inward movement beyond a predetermined radial position so that the interior peripheral surface area of said partially collapsed section is reduced without portions thereof interengaging.

10. The improvement as defined in claim 9 wherein the thickened annular wall portion after being formed by the steps aforesaid has a poly v-belt receiving configuration rolled in the exterior periphery thereof while the interior periphery thereof is supported in a straight axially extending configuration.

11. The improvement as defined in claim 10 wherein prior to the moving step in the formation of said thickened annular wall portion, the can blank has a pair of flanges formed on opposite sides of said annular section which extend radially and axially outwardly of said thickened wall portion after the formation of the latter, one of said flanges being formed by folding upon itself another annular section of said pulley can blank adjacent said first mentioned annular section.

12. The improvement as defined in claim 9, 10 or 11 wherein the thickness of said thickened annular wall portion is greater than said predetermined minimum permissible thickness by a factor of from 1¼ to 2.

13. The improvement as defined in claim 12 wherein said factor is 1⅓ to 1½.

* * * * *